United States Patent [19]

Donoghue et al.

[11] Patent Number: 4,852,898
[45] Date of Patent: Aug. 1, 1989

[54] COLLAPSIBLE HYDRAULIC POLYCYCLE

[75] Inventors: Teresa Donoghue, Paterson; Jose I. Vilches, Passaic, both of N.J.

[73] Assignee: Teresa Donoghue

[21] Appl. No.: 206,714

[22] Filed: Jun. 15, 1988

[51] Int. Cl.$^4$ .............................................. B62M 1/10
[52] U.S. Cl. .................................. 280/216; 100/208; 280/287
[58] Field of Search ................. 280/216, 287, DIG. 5, 280/DIG. 6; 180/208

[56] References Cited

U.S. PATENT DOCUMENTS

| 732,908 | 7/1903 | Thomson | 280/216 |
|---|---|---|---|
| 2,793,876 | 5/1957 | Allwes | 280/216 |
| 2,919,758 | 3/1960 | Newton | 180/210 |
| 3,094,187 | 6/1963 | Horwitz | 180/217 |
| 3,580,349 | 8/1971 | Brennan | 180/208 |
| 3,635,301 | 11/1972 | Tuson | 180/19.2 |
| 3,807,762 | 4/1974 | Ogisu | 280/287 |
| 4,078,816 | 3/1978 | Smith | 280/216 |
| 4,462,606 | 7/1984 | Hon | 280/287 |

Primary Examiner—Kenneth R. Rice
Attorney, Agent, or Firm—M. K. Silverman

[57] ABSTRACT

An improvement in a pedal-operated polycycle including a hydraulic cylinder in fluid and pressure integral communication with piston means depending from such pedals. Further included is a hydraulic line in substantial co-alignment with the mainframe of the polycycle, an input of the hydraulic line being in communication with the hydraulic cylinder. Further provided is a rear wheel drive secured in rotational relationship with both an output of the hydraulic line and a tangent surface of the rear wheel of the polycycle. Upon reciprocation of a hydraulic piston, hydraulic amplification of the pressure of the pedaling action is transmitted through the hydraulic line to the rear wheel drive means thereby applying a rotational force to the tangent surface of the rear wheel causing the resultant rotation of the wheel and a consequential translational movement of the polycycle. The structural elements of the polycycle are provided with several pivot points and collapse areas such that the entire polycycle may be foldably collapsed into a volume the size of the trunk of an automobile.

10 Claims, 2 Drawing Sheets

COLLAPSIBLE HYDRAULIC POLYCYCLE

BACKGROUND OF THE INVENTION

The present invention relates to a collapsible, hydraulically operated polycycle having many usages, this including, but not limited to, that of a golf cart or trolley.

The prior art in the subject area known to the inventors comprises U.S. Pat. No. 2,919,758 (1960) to Newton, entitled Knockdown Powered Golfing Cart; No. 3,094,187 (1963) to Horowitz, entitled Collapsible Motorized Cart; No. 3,580,349 (1971) to Brennan, entitled Portable Motorized Cart; and No. 3,635,301 (1972) to Tuson, entitled Electrically Powered Vehicles.

There has long existed a need in such areas as golfing carts and cycles for the infirm or handicapped, the need for a collapsible cart or cycle having some power means, auxiliary to that of the user's own feet or legs. The collapsibility of such carts or cycles is necessary in order to permit such carts to be transported within the back or trunk of an automobile.

It is, accordingly, as a response to the above long-standing need in the prior art that the present invention may be viewed.

SUMMARY OF THE INVENTION

The invention comprises an improvement in a pedal-operated polycycle having a front-to-rear mainframe and at least one rear axle, each such axle provided with a wheel, said axle journalled within a rear wheel assembly, said assembly selectably pivotable about the rear of said mainframe. The improvement is defined by a hydraulic cylinder in fluid and pressure integral communication with pistons which depend from pedal means. Further provided is a hydraulic line in substantial co-alignment with said mainframe, an input of said line being in hydraulic communication with said hydraulic cylinder. Yet further provided is a rear wheel drive means secured in rotational relationship with both an output of said hydraulic line and a tangent surface of said rear wheel. Upon reciprocation of said pistons, as by a pedaling action of said pedal means, hydraulic amplification of the pressure of said pedaling action will be transmitted through said line to said drive means, thereby applying rotational force to said tangent surface of said rear wheel, this causing a resultant rotation of the rear wheels and a consequential moving of the entire polycycle.

The mainframe and other structural elements of the polycycle are provided with telescoping areas of collapsibility and, as well, pivot points such that, upon selective release of securement elements for said telescoping areas and pivot points, the entire polycycle may be collapsed into a substantially reduced volume.

It is, accordingly, an object of the present invention to provide a collapsible, portable polycycle in the nature of a golfing cart.

It is another object of the present invention to provide a polycycle of the above type which may be readily collapsed for purposes of storage within the trunk of an automobile.

It is a further object of the present invention to provide a collapsible polycycle and cart of the above type that will provide enhanced propulsion capability without requirement for the use of an electric motor or internal combustion engine.

It is yet another object to provide a portable polycycle and cart that will have particular utility to the infirm and handicapped.

The above and yet other objects and advantages of the present invention will become apparent from the hereinafter set forth Detailed Description of the Invention, the Drawings and claims appended herewith.

DETAILED DESCRIPTION OF THE INVENTION

Figure 1:
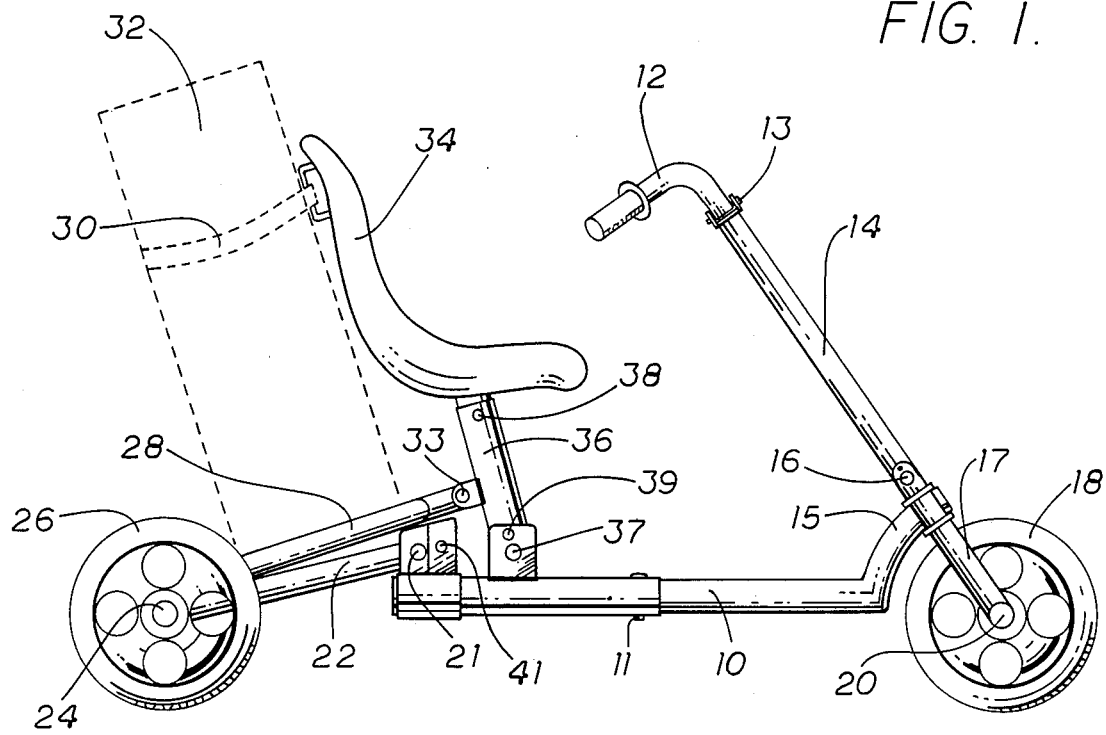
FIG. 1 is a side schematic view of the mechanical framework of the inventive collapsible cart.

With reference to the view of FIG. 1, there is shown the mechanical framework of a polycycle or cart, this framework consisting of a front-to-rear mainframe 10 which is telescopically collapsible through the removal of bolt 11.

Further shown are handlebars 12 which are pivotally connected at points 13 (see FIG. 2) to steering column 14 which, in turn, is pivotally connected to front wheel assembly 15 at point 16. Depending from front wheel assembly 15 is a journal means 17 within which front wheel 18 is journalled by axle 20.

Figure 2:
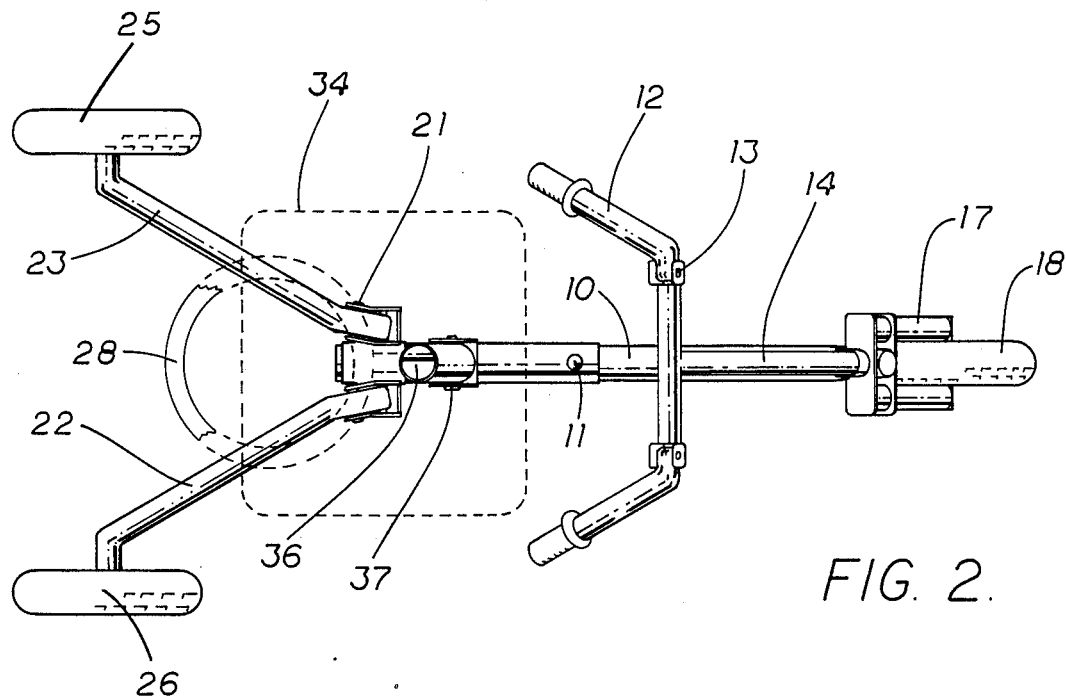
FIG. 2 is a top plan view thereof.

As may be noted in FIGS. 1 and 2, there is further provided seat means 34 (dotted line in FIG. 2), which is secured upon member 36 which, in turn, is pivotally attached to mainframe 10 at pivot point 37 and held by removable pin 39. Seat 34 is pivotally connected to member 36 at point 38.

Pivotally depending from member 36 at point 33 is golf bag support member 28 which is a part of rear wheel assembly 22.

It may be noted that rear wheel assembly means 22 pivots about mainframe 10 at point 21 and rotationally secures axle 24 upon which rear wheel 26 is mounted. A removable pin 41 positions assembly means 22 in its desired location relative to the mainframe.

With reference to FIG. 2, it may be seen that where the inventive polycycle takes the form of a tricycle, there is provided a second rear wheel assembly which is denoted as element 23 having thereon a second rear wheel which is denoted as element 25.

Figure 3:
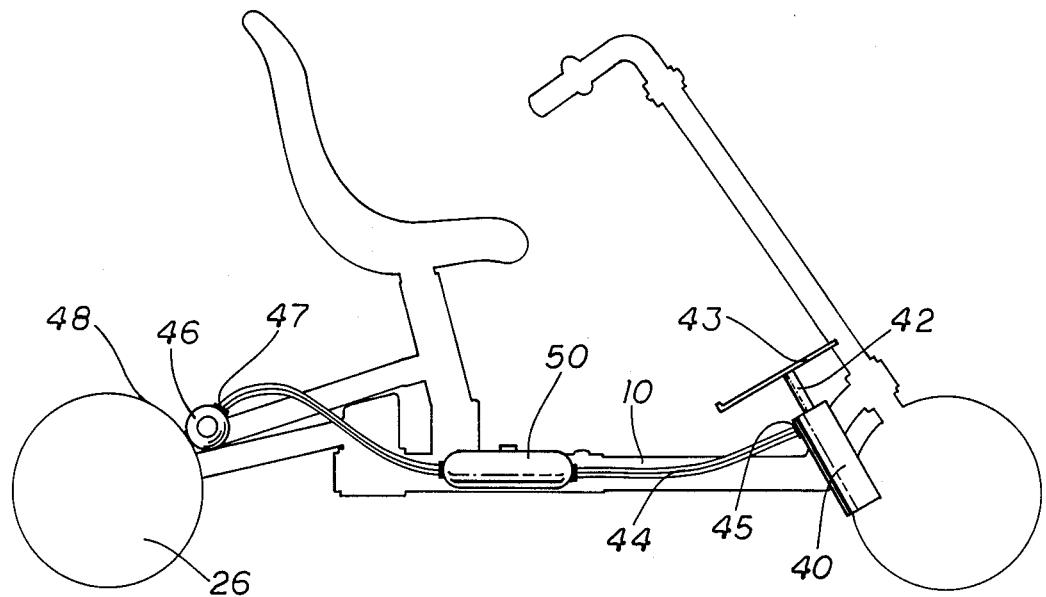
FIG. 3 is a side schematic view of the collapsible cart showing the hydraulic system thereof.

With reference to FIG. 3, there is shown, in schematic view, the hydraulic system by which the collapsible polycycle may be operated. Therein, there is shown a hydraulic cylinder 40 which is in fluid and pressure integral communication with one or more pistons 42 which depend from pedal means 43. Further shown is a hydraulic line 44 which is in substantial co-alignment with the mainframe 10. An input 45 of said line 44 defines the hydraulic interface to cylinder 40.

A rear wheel hydraulic drive means 46 (such as a hydraulic motor) is secured in rotational relationship with both an output 47 of said hydraulic line 44 and a tangent surface 48 of said rear wheel 26. Further provided in the present hydraulic drive system is a hydraulic accumulator 50 which operates to maintain the pressure within hydraulic line 44 at an acceptable level. Accordingly, it may be appreciated that, upon reciprocation of said piston 42 as, for example, through a pedaling action by pedal means 43, a hydraulic amplification of the pressure associated with such pedaling action will be transmitted through said hydraulic line 44 to drive means 46, thereby applying a rotational force to said tangent surface 48 of said rear wheel 26, causing a resultant rotation thereof and a consequential propulsion of the entire polycycle.

In the instant design, it is to be appreciated that front wheel 18 may consist of two front wheels, thereby creating a four-wheeled vehicle or, alternatively, a single wheel may be substituted for rear wheels 25 and 26, particularly when two front wheels are provided.

In a preferred embodiment, pedal means 43 will consist of two individual pedals, one to be operated by each foot of the operator of the polycycle. However, in other embodiments, a small motor may be utilized to apply appropriate reciprocating force to cylinder 42. This embodiment may be useful when the instant polycycle is used by infirm or handicapped persons.

Figure 4:
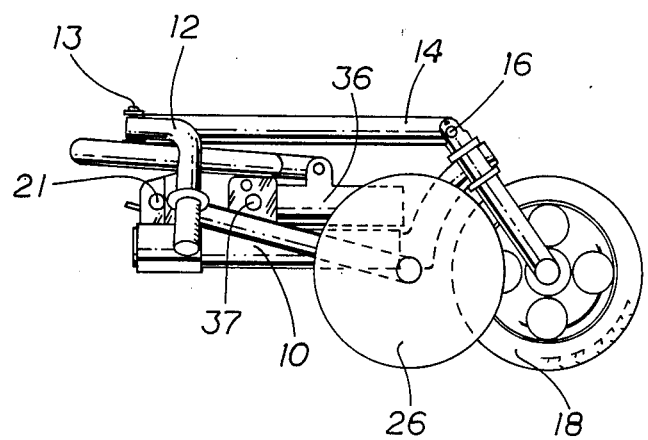
FIG. 4 is a schematic side view showing the polycycle completely collapsed with the seat removed therefrom.

As may be further appreciated with respect to the view of FIG. 4, a number of pivot points and areas of collapsibility have been provided in the present design to render the inventive polycycle/cart portable. More particularly, there is provided the above pivot points 13 for handlebars 12 and selectable pivot release point 16 for folding steering column 14 in the direction of mainframe 10. There is further provided pivot point 21 for folding rear wheels 25 and 26 forwardly under collapsed mainframe 10 in the manner shown in FIG. 4. Therein, seat support element 36 is also shown folded about pivot point 37 in which the seat 34 has been entirely removed.

When the polycycle is collapsed, the golf bag 32 will, of course, be removed as will golf bag securement strap 30.

While the elements of the hydraulic line are not shown in FIG. 4, it is to be appreciated that they are readily folded about hydraulic accumulator 50 and may be readily unfolded to thereby reassume the normal operating arrangement shown in FIG. 3.

It is accordingly to be appreciated that there is provided a self-powered portable polycycle not requiring any on-board source of fuel or power.

Thusly, while there has been herein shown and described the preferred embodiments of the present invention, it is to be understood that the invention may be embodied otherwise than is herein illustrated and described, and that within said embodiments, certain changes in the details of construction and the form and arrangement of the parts may be made without departing from the underlying idea or principles of this invention within the scope of the appended claims.

Having thus described our invention, what we claim as new, useful and non-obvious and, accordingly, secure by Letters Patent of the United States is:

1. In a pedal operated polycycle having at least three wheels and having pedal means, a polycycle comprising:
   (a) a front-to-rear mainframe;
   (b) at least one rear axle and associated wheels, journalled within a rear wheel assembly depending from said mainframe;
   (c) handle bars depending laterally outwardly from a steering column;
   (d) a front wheel assembly integrally depending from a front end of said mainframe and secured to said steering column;
   (e) a front wheel journalled upon a front axle of said front wheel assembly;
   (f) a seat secured on said main frame between said front and rear axles; and
   (g) means for the selective, telescoping, partial collapse of said front-to-rear mainframe;
   (h) a hydraulic cylinder in fluid and pressure integral communication with piston means depending from said pedal means;
   (i) a hydraulic line in substantial co-alignment with said main frame, and input of said line in hydraulic communication with said cylinder; and
   (j) rear wheel drive means securing rotational relationship with both an output of said hydraulic line and a tangent surface of said rear wheels, where upon, upon reciprocation of said piston means, as by a pedalling action applied to said pedal means, a hydraulic amplification of pressure resulting from said pedalling action will be transmitted through said line to said drive means, thereby applying a rotational force to said tangent surface of said rear wheel causing a resultant rotation thereof and a consequential transactional movement of said polycycle.

2. The polycycle as recited in claim 1, further comprising:
   golf club support and containment means secured rearwardly of said seat means and further secured substantially rigidly upon said rear wheel assembly.

3. The improvement as recited in claim 2 in which said rear wheel and rear wheel assembly comprise a plurality of respective rear wheels and rear wheel assemblies.

4. The improvement as recited in claim 3 in which said pedal means comprises non-manual means for reciprocation of said piston means.

5. The improvement as recited in claim 4 in which said non-manual reciprocation means comprises motor means.

6. The improvement as recited in claim 1, further comprising:
   means for the selectable pivot of said steering column relative to said front wheel assembly.

7. The improvement as recited in claim 6 further comprising:
   means for the selectable pivot of said handlebars relative from said steering column.

8. The polycycle as recited in claim 6, further comprising:
   means for selectable pivot of said rear wheel assembly about a rear end of said mainframe.

9. The improvement as recited in claim 6 further comprising:
   means for the selectable pivot of said seat means relative to said mainframe.

10. The improvement as recited in claim 6 further comprising:
    golf club support and containment means secured rearwardly of said seat means and further secured substantially rigidly upon said rear wheel assembly.

* * * * *